Nov. 28, 1933.  D. G. SHEARER  1,936,885
METHOD OF PRODUCING FOREIGN VERSIONS OF MOTION PICTURE PLAYS
Filed Jan. 2, 1932
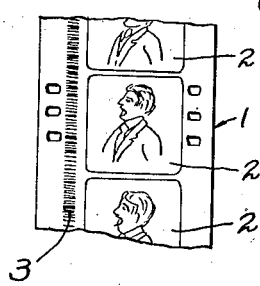
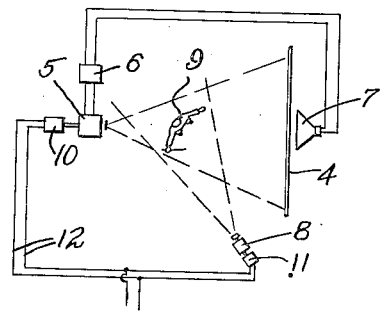
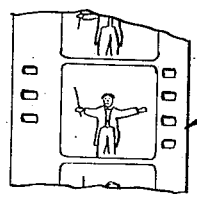
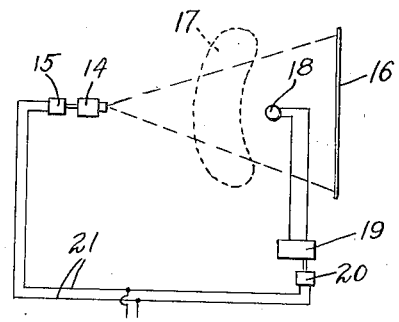
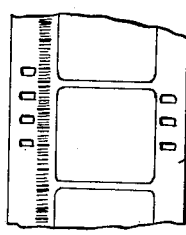
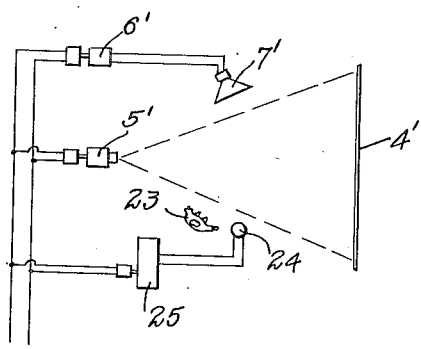
Inventor
Douglas Graham Shearer
By Lyon & Lyon
Attorney.

Patented Nov. 28, 1933

1,936,885

UNITED STATES PATENT OFFICE 1,936,885

METHOD OF PRODUCING FOREIGN VERSIONS OF MOTION PICTURE PLAYS

Douglas Graham Shearer, Santa Monica, Calif., assignor to Metro-Goldwyn-Mayer Corporation, Culver City, Calif., a corporation of New York Application January 2, 1932. Serial No. 584,451

7 Claims. (Cl. 88—16.2)

This invention relates to methods whereby foreign versions of photoplays consisting of pictorial representations of action, musical sounds and voice, may be readily and economically produced. By the term "a foreign version" of a photoplay, reference will be had herein to a photoplay adapted for use in a country or locality in which a language different from that in which the original photoplay was recorded, is used.

Such foreign versions may differ somewhat from the original version in that the voice may be completely missing and only a recording of musical accompaniment provided in synchronous relation to the pictorial representations of the action. Or the foreign version may have spoken words in a foreign language with or without a concurrent musical accompaniment.

In numerous photoplays, and particularly in photoplays of musical comedies and operettas, a combined sound record bearing both voice and music is provided. Such combined record is synchronized with the picture film of the action. Heretofore, in order to produce a foreign version of a film of this sort, it was necessary to obtain a combined recording of music, and voice in a foreign language, said music and voice being synchronized to the same picture film or action. When foreign versions in three or four languages are being produced from the same film, the procedure necessitated the maintenance of a full orchestra for a protracted period of time and for each one of the foreign versions. Furthermore, great difficulty has been experienced in obtaining synchronism between the new sound records and the previously taken picture film of the action.

One of the objects of this invention is to disclose and provide a method of producing foreign versions of photoplays of the character described hereinbefore in a much more ready and positive manner.

Another object of the invention is to disclose and provide a method whereby a record of music alone may be produced from and synchronized with a previously recorded combined record of voice and music.

A still further object of this invention is to disclose and provide a novel method of imparting tempo, identical with a previously recorded sound record and action sound sources in the production of new records synchronized with previously recorded action.

These and other objects, uses and advantages of this invention will become apparent to those skilled in the art from the following detailed description of a preferred mode of operation, reference being had to the appended drawing which diagrammatically illustrates the various steps of the preferred method. It is to be understood that the invention is not limited to the specific process and apparatus disclosed in said drawing as several changes and modifications may be made without departing from the spirit of the invention embraced thereby.

In the drawing:—

Fig. 1 represents a portion of a complete film of action, said film bearing a combined voice and music record synchronized with said action.

Fig. 2 diagrammatically represents an arrangement of elements whereby a synchronizing film may be obtained.

Fig. 3 diagrammatically represents a portion of the synchronized film obtained by the arrangement of elements and step of the process illustrated in Fig. 2.

Fig. 4 represents an arrangement of elements which may be employed in carrying out the second step of the process.

Fig. 5 diagrammatically represents a sound record of music obtained by carrying out the step illustrated in Fig. 4.

Fig. 6 represents an arrangement of elements by means of which the record of Fig. 5 may be combined with a voice so as to produce a combined voice and music record synchronized with the action shown in the original film.

One of the essential steps of the method embraced by this invention is the production of a synchronizing film. By a synchronizing film, reference is made to a film intermediate the original picture and sound record, and the finished foreign version of said sound record. This may be best understood by describing one adaptation of the process in detail.

Given an original film or photoplay indicated generally at 1 in Fig. 1 and consisting of pictorial representations of action 2 and a sound record 3 synchronized therewith, said sound record including a voice in the original language such as English, and a musical accompaniment, it is desired to produce a foreign version of the photoplay, said foreign version utilizing the original action 2 but employing a new combined voice and music record, the voice being in a foreign language as, for example, French. Such finished foreign film is obtained in accordance with this invention in the following manner:

The film 1 is projected upon a screen 4 by means of a suitable projector 5 operatively connected with a sound reproducing and amplifying unit 6 and a speaker or horn 7. The projection machine 5 is operatively connected or interlocked with a camera 8, said camera 8 being directed upon and adapted to photograph a musical director 9 so placed as to be able to observe the projected images on the screen 4 and to hear the original sound recording as reproduced by the horn 7. The projection machine 5 and the camera 8 may be electrically interlocked. For example, the projection machine 5 may be driven by a synchronous motor 10 and the camera 8 may be driven by another synchronous motor 11, the motors 10 and 11 being electrically connected as by lines 12 with a suitable source of electrical energy. The speed of film passing through the projector 5 is therefore identical with the speed of film passing through the camera 8.

The musical director 9, while observing the projected images of the film 1 on the screen 4 and while listening to the original music and voice record, directs an imaginary orchestra playing the music which is being reproduced.

The camera 8 photographs the musical director 9 and in this manner, a film 13 (Fig. 3) of the musical director is obtained, this film 13 obviously being synchronized with the original film 1.

The next step of the invention contemplates the production of a sound record of the musical accompaniment, provision being made for assuring the production of a sound record which is positively synchronized with the tempo of the original action 2 recorded on the original film 1. Such sound record may be obtained by the arrangement of elements illustrated in Fig. 4 wherein a projection machine 14 driven by a motor 15 projects the film 13 upon a screen 16. A suitable orchestra, indicated at 17, is positioned in front of the screen 16 so as to be able to observe the images of the musical conductor projected thereon. Such orchestra then follows the leadership of the conductor or musical director and the music played by said orchestra is gathered or picked up by microphone or microphones 18 and conveyed to a sound recording machine 19. The recording machine 19 is driven in synchronism with the projector 14 and such synchrony may be attained by having the sound recording machine 19 driven by motor 20 supplied with electrical energy by lines 21.

With synchronous motors 15 and 20, absolute synchronism of the projector 14 and recording machine 19 may be readily attained. The sound record produced by the recording machine 19 is illustrated in Fig. 5 as 19'.

For those foreign versions where it is not necessary that a voice record be combined with music, the picture record 2 may be printed in the picture areas of record 19', thereby giving rise to a version of the original photoplay which merely consists of the action and musical accompaniment and which does not include the original voice recordings. If however, a more complete foreign version is desired including a voice in a foreign language, the subsequent step is taken.

The action 2 on the film 1 is projected by a projector 5' upon a screen 4'; the original sound recording 3 is masked and not reproduced during the projection of the action 2. The musical record 19' is reproduced by a reproducing device 6' and rendered audible through the horn 7'. The reproducing unit 6' as well as the projection machine 5' are synchronously operated by either a mechanical interlock or an electrical interlock. An actor capable of singing and talking in the foreign language, is then positioned in view of the screen 4' as indicated at 23, said actor being then able to observe the projected images of the original action 2 upon the screen 4', and to hear the music emanating from the horn 7'. The voice of the actor 23 as well as the musical accompaniment reproduced by the horn 7', is picked up by a microphone 24 and conveyed to a recording machine 25 also operated in synchronism with the projector 5' and the reproducing unit 6'. As shown in Fig. 6, the units 6', 5' and 25 are driven by synchronous motors supplied from the same source of electrical energy. In this manner, a combined voice and sound record is obtained by the recording machine 25, the voice being in a language foreign to that occurring in the original sound recording 3. The actor or actors 23 rendering the foreign voice are preferably provided with phonetic translations of the original voice so that the lip movements of the two versions more or less correspond to each other.

The combined voice and musical record obtained by the recording device 25 is then printed upon a film bearing the original action 2 and such finished film will therefore consist of the original action and a synchronized voice and music record, the voice being rendered in a language other than that appearing on the original film 1.

Those skilled in the art will observe that several changes may be made in the process described hereinabove without departing from the spirit of the invention embraced. For example, during the recording of the music by the step illustrated in Fig. 4, the foreign actor or actors may observe the projected image of the musical director and render the foreign voice version at the same time that the orchestra is rendering the musical accompaniment, thereby producing a combined voice and music record on the recording machine 19 and obviating the necessity of taking the step illustrated in Fig. 6. When this modified method is employed, however, it is somewhat more difficult to obtain the proper volume balance between the voice and the music whereas step 6 permits the actors 23 to be positioned properly with respect to the microphone 24 and the reproducing horn 7' so as to form a finished combined sound and music record in which the volume of the music is properly proportioned to the voice. Furthermore, the amplitude of the reproduced music record may be readily varied by the normal amplifier controls provided on reproducing units 6'.

It will be seen, therefore, that the necessity of retaking the entire film as well as the necessity of having foreign actors 23 and a full orchestra present simultaneously during the photography and recording of the foreign versions, is obviated by the method described hereinabove and the personality, appearance and characteristics of the original actors are thus retained in the foreign version. The production of foreign versions of photoplays can therefore be carried out very economically.

It is to be understood that although the specific examples given hereinabove refer to voice and music records photographically recorded upon film stock, the method is also applicable to other specific forms of recordings. For example, the sound may be recorded on a telegraphone, wire or tape or inscribed on a suitable carrier such as a disc, wire, tape, or the like.

It is also to be understood that the invention is not limited to the utilization of any specific form of the apparatus for placing the method in operation.

All such changes and modifications as come within the scope of the appended claims are embraced thereby.

I claim:

1. In a method of producing foreign versions of motion picture films having a concurrent music and voice record synchronized with the picture record of the action, the steps of forming a picture record of a musical director while simultaneously and synchronously projecting the picture record of the original action and reproducing the sound corresponding to said picture record, and then projecting the picture record of said musical director, at the speed at which the original action was projected, and forming a sound record of music played by musicians while observing the projected picture record of said musical director.

2. In a method of producing foreign versions of motion picture films having a concurrent music and voice record synchronized with the picture record of the action, the steps of forming a picture record of a musical director while simultaneously and synchronously projecting the picture record of the original action and reproducing the sound corresponding to said picture record, and then forming a combined sound record of music played by musicians and voice rendered in a foreign language by an actor, by projecting the picture record of said musical director, at the speed at which the original action was projected, and synchronously forming a record of music and voice created by said musicians and actor while observing the projected picture record of said musical director.

3. In a method of producing foreign versions of motion picture films as defined in claim 2, the step of finally combining said combined sound record of music and voice in a foreign language with the original picture record of the action.

4. In a method of producing a foreign version of a motion picture film having a concurrent music and voice record synchronized with the picture record of the action, the steps of forming a picture record of a musical director while simultaneously and synchronously projecting the picture record and reproducing the sound corresponding to said picture record, projecting the picture record of said musical director, at the speed at which the original action was projected, and synchronously forming a sound record of music played by musicians while observing the projected picture record of said musical director, and then projecting the original picture record of the action, synchronously reproducing the musical sound record made as described hereinabove, and synchronously forming a combined musical and voice record, said voice being rendered in a foreign language by an actor observing the projected picture record of the original action and listening to the musical sound record.

5. In a method of producing a foreign version of a motion picture film having a concurrent music and voice record synchronized with the picture record of the action, the steps of forming a picture record of a musical director while simultaneously and synchronously projecting the picture record and reproducing the sound corresponding to said picture record, projecting the picture record of said musical director, at the speed at which the original action was projected, and synchronously forming a sound record of music played by musicians while observing the projected picture record of said musical director, then projecting the original picture record of the action, synchronously reproducing the musical sound record made as described hereinabove and synchronously forming a combined musical and voice record, said voice being rendered in a foreign language by an actor observing the projected picture record of the original action, and finally combining the foreign voice and music record with the original picture record of the action.

6. A method of producing motion picture films having a sound record synchronized therewith, comprising the steps of forming a picture record of a musical director while simultaneously and synchronously projecting a picture record of a previously taken action, and then separately projecting the picture record of said director and forming a record of sound rendered by sources observing the projected picture record of said musical director.

7. A method of producing motion picture films having a sound record synchronized therewith, comprising the steps of forming a picture record of a musical director while simultaneously and synchronously projecting a picture record of a previously taken action, then separately projecting the picture record of said director and forming a record of sound rendered by sources observing the projected picture record of said musical director, and then combining said sound record with the picture record of the action to form a composite and synchronized sound and picture record.

DOUGLAS GRAHAM SHEARER.